March 18, 1958     L. C. CARISSIMI ET AL     2,827,578

ELECTRIC SHAVER VIBRATOR MOTOR

Filed Aug. 12, 1954

INVENTORS.
LOUIS C. CARISSIMI
EDGAR S. TOLMIE
BY
ATTORNEYS

United States Patent Office 2,827,578
Patented Mar. 18, 1958

2,827,578
ELECTRIC SHAVER VIBRATOR MOTOR

Louis C. Carissimi, Fairfield, and Edgar S. Tolmie, Bridgeport, Conn., assignors, by mesne assignments, to Sperry Rand Corporation, New York, N. Y., a corporation of Delaware Application August 12, 1954, Serial No. 449,462

4 Claims. (Cl. 310—38)

This invention relates to new and useful improvements in vibratory motors and especially one for use in electric shaving devices.

A main object of this invention is to provide a vibratory magnetic motor the movable element of which oscillates in a circular path and which will operate on an alternating current or a pulsating direct current and be practically noiseless.

A further object is to provide an oscillating armature with multiple poles balanced with respect to the armature shaft to reduce vibration and disposed with exact concentricity with respect to multiple pole field magnets to give increased power and economy and high efficiency.

Another object is to provide simple means to adjust the throw of the oscillating armature which can be easily achieved by reason of the concentricity of the polar paths.

Yet another object is to simplify the structure by mounting the cutter drive arms directly on the oscillating armature.

Yet another object is to provide simple and efficient means to adjust the armature on its shaft without altering the position of a set of balanced tensioning springs associated with the shaft.

A still further object is to provide a motor unit which can be assembled complete ready to function, timed and adjusted ready to be inserted into an enclosing casing and connected to the cutter heads.

Further and more specific objects, features, and advantages will more readily appear from a consideration of the specification hereinafter set forth especially when taken in connection with the accompanying drawings which illustrate a present preferred form which the invention may assume and which forms part of the specification.

In brief and general terms, the invention comprises a stator magnet with a plurality of salient pole pieces disposed with their faces in the circumference of a circle and with the pole pieces balanced symmetrically on opposite sides of a vertical line drawn through the center of the circle. A multi-polar armature is axially disposed on a shaft with the pole pieces symmetrically disposed in balanced fashion on opposite sides of the vertical line above mentioned. One or more cutter operating drive arms are connected directly to the armature and move therewith without any intervening linkages or levers. Supporting non-magnetic plates fixed to and on opposite sides of the stator faces provide bearings for the rotor shaft and an elongate arm fixed to the end of the shaft is, at each end, balanced by oppositely disposed pairs of tensioning and compensating springs supported in said plates and which are so initially adjusted as to dispose the armature poles slightly offset with respect to the stator poles.

In further particulars the invention concerns simple and efficient means to adjust the armature accurately on its shaft longitudinally as well as angularly with respect to the shaft.

A further feature resides in the provision of means whereby the parts may be quickly and easily and accurately assembled.

The preferred present form which the invention may assume is shown in the drawings of which, Fig. 1 is a front elevation of the motor with the armature in position of rest and the casing shown in dot and dash lines;

Figure 1:
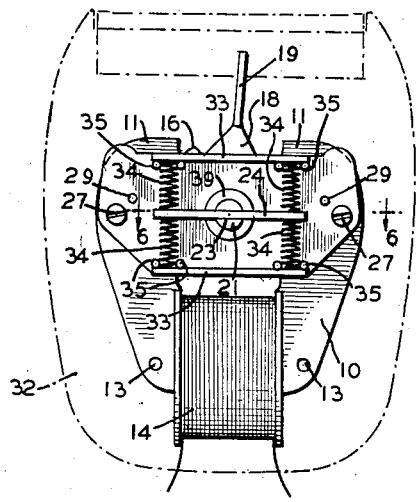

Referring now merely to the present preferred form of the invention shown in the drawings, it will be seen that the motor comprises a U-shaped stator element made up of a plurality of shaped lamination 10 of magnetizable material. These laminations have spaced polar areas 11 each with a series of salient pole faces 12 relatively spaced and in a circular path having a common center and with an equal number of poles on each side of a vertical line running through the center of said circle. The laminations are held together by suitable rivets 13. A magnetizing coil 14 is disposed in any suitable fashion around the base of the U-shaped stator element.

Figure 2:
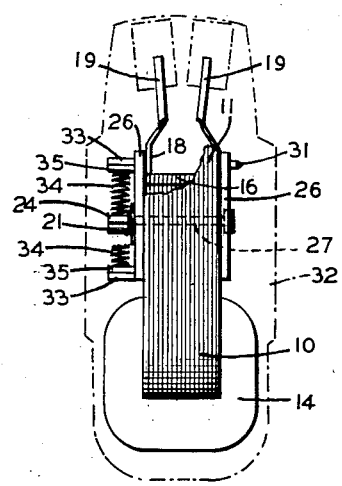
Fig. 2 is a side elevation partly broken away as viewed from the right side of Fig. 1.
Figure 3:
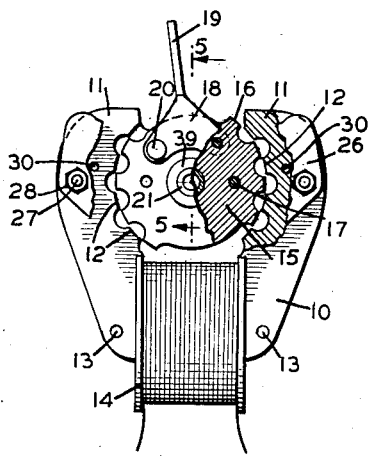
Fig. 3 is a rear elevation, with portions broken away, showing the armature in position of rest.
Figure 4:
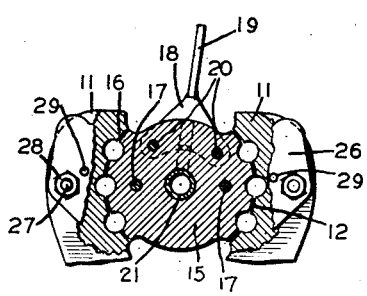
Fig. 4 is a similar view showing the armature in its position at the other end of its stroke under magnetic impulsion.
Figure 6:
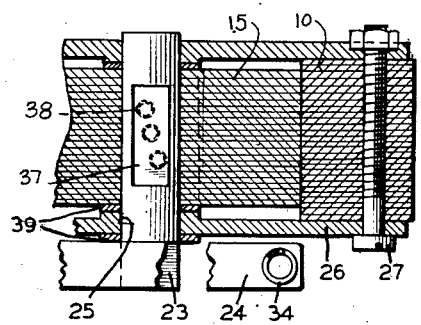

Adapted to be disposed within the circular area between the polar areas 11 of the stator element is an armature formed of a series of laminations 15. On each side of the center line of the armature are disposed, on its periphery, an equal number of salient pole faces 16. These faces on each side are equal in number to the number of pole faces adjacent thereto on the stator element. The pole faces 16 are disposed in a circular line just within that formed by the faces of the poles on the stator element. The armature laminations 15 are held together by rivets 17. To the upper sides of the armature are connected plates 18 from which drive arms 19 extend upwardly as seen in Figs. 1 and 2. These plates are connected through the laminations 15 by means of screws 20. The normal rest position of the armature is shown in Fig. 3 in which it will be noted that the pole faces 16 on the armature are slightly offset with respect to the pole faces 12 on the stator element. When the stator coil is energized the magnetic flux thus created tends to pull the armature to the position shown in Fig. 4 in which the corresponding pole faces of the armature and the stator are in closest alignment.

Figure 5:
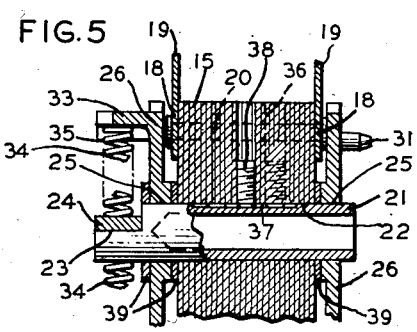
Fig. 5 is a partial vertical longitudinal section taken on the line 5—5 of Fig. 3; and, Fig. 6 is a partial transverse horizontal section taken on the line 6—6 of Fig. 1.

The armature is mounted on a shaft 21 which from one end through most of its length is hollow as at 22. The other end of the shaft is solid but is cut down as at 23 to form a flat surface to which is welded or otherwise connected a flat bar 24. This end of the shaft 21 extends well beyond the adjacent side face of the stator as shown in Fig. 5. This shaft is journalled in bearing apertures 25 in a pair of plates 26. These plates are supported from the stator element by means of screw bolts 27 and nuts 28 which pass through the stator laminations 10. These plates are provided with small dowel pins 29 which extend therefrom toward the adjacent faces of the stator element which are provided with small indentations 30 to receive the tapered ends of the dowel pins and thus accurately hold the plates in proper relation to the stator element and thereby hold the armature shaft also in proper position. One of the plates 26 is provided with a pair of outwardly extending studs 31

(one shown in Fig. 5) which are adapted to register with suitably disposed holes (not shown) in the casing 32 to assist in the positioning of the motor within the casing.

As shown in Fig. 1, the bar 24 extends transversely beyond the axis of the shaft 21 on each side thereof. The plate 26 on this side of the device has outwardly extending flanges 33 along its top and bottom edges and these flanges in length are coextensive with the length of the bar 24 as seen in Fig. 1. Disposed between the ends of the flanges 33 and the ends of the bar 24 are coiled stabilizing springs 34. Thus at opposite ends of the bar 24 are arranged pairs of opposed springs which will tend to resist movement of the bar in any direction from its normal position of rest as shown in Fig. 1. The flanges 33 are provided with integral teats 35 on each side of the adjacent ends of the springs to hold them in position. The other ends of the springs in contact with the surfaces of the bar 24 are anchored thereto in any suitable manner (not shown).

In order to adjust the armature on the shaft 21, it is provided with a plurality of apertures such as 36 arranged diagonally with respect to the axis of the shaft and extending to the surface of the shaft which along its upper portion at this point is cut down to form a flat surface 37 (see Fig. 5). By adjusting the armature along the axis of the shaft to the desired position, a screw 38 in the medial aperture is brought down to bear on the flat surface 37. This will position the armature along the shaft. Then either one of the other screws 38 in the other apertures are screwed down to tilt the armature to adjust the armature angularly thereon to vary the oscillation amplitude of the arms 19. When this adjustment is satisfactory then all the screws 38 are tightened up and the armature is in exact desired relative position with respect to the stator. Spacing washers 39 are disposed between the plates 26 and the armature around the shaft 21 and between the one plate 26 and the bar 24 as shown clearly in Fig. 5. This adjustment will therefore permit the positioning of the armature to vary the amplitude of its oscillation as desired.

While we have described what we consider to be a highly desired embodiment of our invention, it is obvious that many changes in form could be made without departing from the invention, and we, therefore, do not limit ourselves to the exact form herein shown and described, nor to anything less than the whole of our invention as hereinbefore set forth, and as hereinafter claimed.

What we claim as our invention is:

1. A shaver motor which comprises a stator element with opposed polar areas, an armature disposed within said areas for oscillation, a drive arm fixed to said armature, a shaft on which said armature is mounted, bearing plates fixed to opposite sides of the stator element and supporting said shaft, one end of the shaft having a flattened upper face, an elongate member fixed to said end of said shaft and extending in opposite directions from the axis of the shaft, and pairs of opposed springs extending from one of said plates to opposite ends of the said member to resist the movement of the shaft in any direction from a position of rest.

2. A shaver motor which comprises an oscillatable armature, a shaft on which said armature is mounted, said shaft having a flattened periphery along a portion of its length, a plurality of apertures in the armature extending from its periphery inwardly to the flattened surface of the shaft, said apertures arranged in a line diagonal to the axis of the shaft, and set screws adjustable in said apertures to contact said flattened surface of the shaft to adjust the armature in desired positions longitudinally and angularly with respect to the shaft.

3. A shaver motor which comprises a stator element having opposed polar areas, a plate fixed to one side of the stator element and of non-magnetic material, said plate having outwardly extending flanges along its upper and lower edges, an armature disposed for oscillation within said stator polar areas, a shaft on which said armature is mounted and having one end extending beyond the side of the stator element on which said plate is disposed, said end of the shaft having an upper end face flattened, an elongate bar fixed to said end of the shaft and normally disposed parallel to the flanges on the plate, said bar extending in opposite directions from the shaft axis and springs extending from each end of each flange toward and contacting with the adjacent end of the elongate bar to resist the movement of the shaft in any direction from its position of rest.

4. A shaver motor comprising a stator element having opposed polar areas with a plurality of salient pole faces on each area disposed in a circular path, the number of faces on each area being equal, an oscillatable armature having a plurality of pole faces on its periphery disposed in a circular path concentric with the path occupied by the pole faces of the stator element, the armature pole faces being equal in number on each side of a diametrical line passing through the armature, a plate fixed to the upper side of the armature and a drive arm fixed to the plate and extending outwardly between the pole ends of the stator element and along a diametrical line of the armature, a shaft on which said armature is mounted, bearing plates fixed to the opposite sides of the stator element and supporting said shaft, one end of said shaft having a flattened upper face, an elongate bar fixed to said end of the shaft and extending in opposite directions from the axis of the shaft, the plate adjacent the flattened end of the shaft having outwardly extending flanges near the ends of its upper and lower edges, said bar normally disposed parallel to the pairs of flanges on the upper and lower edges of the plate, and springs extending from each flange toward and contacting with the adjacent end of the elongate bar to resist movement of the bar in any direction from its normal position.

References Cited in the file of this patent

UNITED STATES PATENTS

| | | |
|---|---|---|
| 349,005 | Sargent | Sept. 14, 1886 |
| 1,102,819 | Taylor | July 7, 1914 |
| 1,728,338 | Jeanneret | Sept. 17, 1929 |
| 2,536,468 | Russell | Jan. 2, 1951 |
| 2,574,082 | Andersen | Nov. 6, 1951 |
| 2,632,292 | Amend | Mar. 24, 1953 |
| 2,640,895 | Boswau | June 2, 1953 |
| 2,671,863 | Mathews | Mar. 9, 1954 |
| 2,692,345 | Wahlberg | Oct. 19, 1954 |

FOREIGN PATENTS

| | | |
|---|---|---|
| 414,688 | Great Britain | July 30, 1934 |
| 605,082 | Germany | Nov. 3, 1934 |
| 650,052 | Great Britain | Feb. 14, 1951 |
| 685,090 | France | Mar. 25, 1930 |
| 691,804 | Great Britain | May 20, 1953 |